(12) United States Patent
Ishida (10) Patent No.: US 8,339,557 B2
(45) Date of Patent: Dec. 25, 2012

(54) LIQUID CRYSTAL DISPLAY PANEL

(75) Inventor: Satoshi Ishida, Gifu (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 12/884,487

(22) Filed: Sep. 17, 2010

(65) Prior Publication Data

US 2011/0075081 A1 Mar. 31, 2011

(30) Foreign Application Priority Data

Sep. 28, 2009 (JP) ................................ P2009-222094

(51) Int. Cl.
G02F 1/1343 (2006.01)
G02F 1/1337 (2006.01)
G02F 1/1333 (2006.01)

(52) U.S. Cl. ........................... 349/141; 349/123; 349/138

(58) Field of Classification Search .................. 349/123, 349/138, 141
See application file for complete search history.

(56) References Cited

U.S. PATENT DOCUMENTS

| 6,191,837 | B1 * | 2/2001 | Fujimaki et al. | 349/141 |
| 6,362,032 | B1 * | 3/2002 | Kim et al. | 438/158 |
| 7,180,564 | B2 | 2/2007 | Shimizu et al. | |
| 7,636,144 | B2 | 12/2009 | Horiguchi et al. | |
| 7,932,980 | B2 * | 4/2011 | Ge et al. | 349/141 |
| 2001/0048501 | A1 * | 12/2001 | Kim et al. | 349/141 |
| 2002/0008828 | A1 * | 1/2002 | Park et al. | 349/141 |
| 2005/0128389 | A1 * | 6/2005 | Yang | 349/114 |
| 2005/0128390 | A1 * | 6/2005 | Yang | 349/114 |
| 2005/0128414 | A1 * | 6/2005 | Yang | 349/143 |
| 2005/0140901 | A1 * | 6/2005 | Yang et al. | 349/141 |
| 2005/0179841 | A1 * | 8/2005 | Yang | 349/114 |
| 2005/0243256 | A1 * | 11/2005 | Yang et al. | 349/141 |
| 2005/0259207 | A1 * | 11/2005 | Yang et al. | 349/141 |
| 2007/0182892 | A1 * | 8/2007 | Higa et al. | 349/114 |
| 2008/0137018 | A1 * | 6/2008 | Lin et al. | 349/141 |
| 2008/0239223 | A1 | 10/2008 | Fujita | |
| 2009/0185088 | A1 * | 7/2009 | Shinohara | 349/12 |
| 2010/0079712 | A1 * | 4/2010 | Tanaka et al. | 349/123 |
| 2011/0075081 | A1 * | 3/2011 | Ishida | 349/123 |

FOREIGN PATENT DOCUMENTS

| JP | 2005-084180 | 3/2005 |
| JP | 2008-096469 | 4/2008 |
| JP | 2008-164958 | 7/2008 |
| JP | 2008-180928 | 8/2008 |
| JP | 2008-268841 | 11/2008 |
| JP | 2009-036800 | 2/2009 |

* cited by examiner

*Primary Examiner* — Rhonda Peace
(74) *Attorney, Agent, or Firm* — K&L Gates LLP

(57) ABSTRACT

Disclosed herein is a liquid crystal display panel of a transverse electric field system, including: a liquid crystal layer; and a pair of substrates configured to be so disposed as to be opposed to each other and sandwich the liquid crystal layer. In the liquid crystal display panel, a first electrode and a second electrode for applying an electric field to the liquid crystal layer and an alignment film are formed in a plurality of pixel areas that form a display area in one of the pair of substrates, a planarization insulating film is formed on a surface of at least one of the first electrode and the second electrode and across an entire surface of the pixel areas, and the alignment film is formed on a surface of the planarization insulating film.

5 Claims, 6 Drawing Sheets

LIQUID CRYSTAL DISPLAY PANEL

CROSS REFERENCES TO RELATED APPLICATIONS

The present application claims priority to Japanese Priority Patent Application JP 2009-222094 filed in the Japan Patent Office on Sep. 28, 2009, the entire content of which is hereby incorporated by reference.

BACKGROUND

The present application relates to liquid crystal display panels of the transverse electric field system, and particularly to liquid crystal display panels of the in-plane switching (IPS) mode and the fringe field switching (FFS) mode in which the surface of the array substrate is planarized and the occurrence of a burn-in phenomenon, displaying unevenness, and flicker is suppressed.

The liquid crystal display panel has features of lighter weight, smaller thickness, and lower power consumption compared with the cathode ray tube (CRT) and therefore is used as a display unit in many pieces of electronic apparatus. The liquid crystal display panel is to display an image by changing the orientation of liquid crystal molecules aligned along a predetermined direction by an electric field to thereby change the amount of light passing through the liquid crystal layer.

The method for applying the electric field to the liquid crystal layer of the liquid crystal display panel includes a method of the vertical electric field system and a method of the transverse electric field system. In the liquid crystal display panel of the vertical electric field system, an electric field along substantially the vertical direction is applied to liquid crystal molecules by a pair of electrodes sandwiching the liquid crystal layer. As the liquid crystal display panel of this vertical electric field system, liquid crystal display panels of the twisted nematic (TN) mode, the vertical alignment (VA) mode, the multi-domain vertical alignment (MVA) mode, the electrically controlled birefringence (ECB) mode, etc. are known.

In the liquid crystal display panel of the transverse electric field system, a pair of electrodes insulated from each other are provided on the internal surface side of one of a pair of substrates sandwiching the liquid crystal layer, and an electric field along substantially the lateral direction is applied to liquid crystal molecules. As the liquid crystal display panel of this transverse electric field system, a liquid crystal display panel of the IPS mode, in which the pair of electrodes do not overlap with each other in plan view, and a liquid crystal display panel of the FFS mode, in which the pair of electrodes overlap with each other in plan view, are known. The liquid crystal display panel of the transverse electric field system is increasingly used in recent years because it has an advantage that a wide viewing angle can be obtained.

As the IPS-mode liquid crystal display panel, a liquid crystal display panel in which the pair of electrodes are formed on the same layer is known as shown in Japanese Patent Laid-open No. 2005-084180 (Patent Document 1). In addition, a liquid crystal display panel in which an inter-electrode insulating film is formed between the pair of electrodes is known as shown in Japanese Patent Laid-open No. 2008-164958 (Patent Document 2). In both of the IPS-mode liquid crystal display panels, the pair of electrodes are formed into a comb-teeth shape and do not overlap with each other in plan view. Thus, both IPS-mode liquid crystal display panels have problems that the liquid crystal molecules located over the pixel electrode are not sufficiently driven and the aperture ratio and the transmittance are low.

On the other hand, as shown in Japanese Patent Laid-open No. 2009-036800, Japanese Patent Laid-open No. 2008-268841, and Japanese Patent Laid-open No. 2008-180928 (Patent Documents 3, 4, and 5, respectively), there have been developed FFS-mode liquid crystal display panels in which the pair of electrodes overlap with each other in plan view and slit apertures are provided in the upper electrode. In the FFS-mode liquid crystal display panel disclosed in Patent Document 3, the lower electrode is formed in the same layer as that of the scan line. Therefore, although a gate insulating film and a passivation film exist between the upper electrode and the lower electrode, there is a problem that the scan line and the upper electrode working as the pixel electrode are close to each other and thus an unnecessary electric field arises because both of the gate insulating film and the passivation film are a thin film. Furthermore, because the lower electrode working as the common electrode is so formed as to be separated for each pixel, wiring for the common electrode for each pixel is ensured by forming an opaque common line in parallel to the scan line and in the same layer as that of the scan line in such a way that part of the lower electrode overlaps with this common line. Therefore, there are problems that the aperture ratio is lowered and that a step is generated in the upper electrode at the position overlapping with the common line in plan view attributed to the overlapping of the common electrode with the common line and the alignment of liquid crystal molecules is disturbed at this step part.

In contrast, Patent Documents 4 and 5 disclose applications of FFS-mode liquid crystal display panels in which the layer over the thin film transistor (TFT) is planarized and an interlayer insulating film to separate the scan line from the pixel electrode is formed. In the FFS-mode liquid crystal display panels disclosed in Patent Documents 4 and 5, the common electrode is formed across all the pixels in the display area and this common electrode is connected to the common line in the peripheral part of the display area. Thus, the opaque common line for interconnecting the common electrodes is not formed for the pixels. Therefore, the FFS-mode liquid crystal display panels disclosed in Patent Documents 4 and 5 have features of higher aperture ratio and higher contrast compared with the FFS-mode liquid crystal display panel disclosed in Patent Documents 3.

Japanese Patent Laid-open No. 2008-096469 (Patent Document 6) also discloses the related art of the present application.

SUMMARY

Figure 6A:
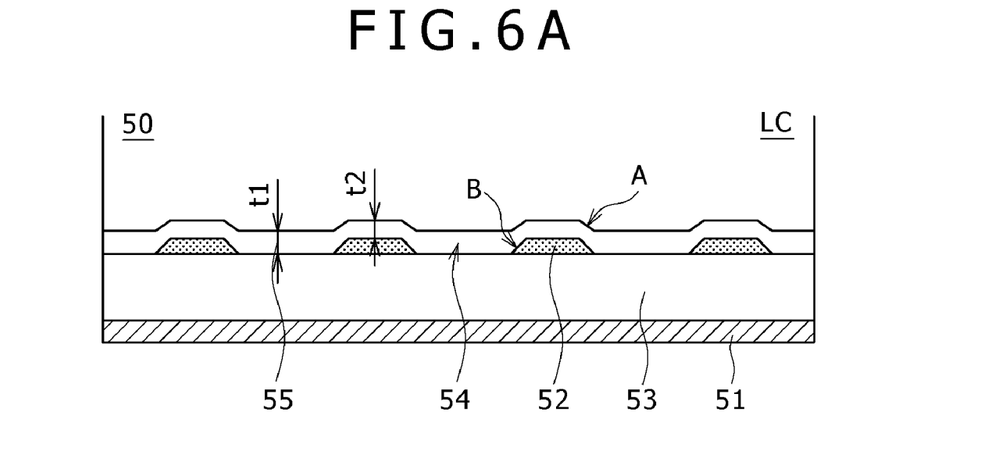
FIG. 6A is a schematic sectional view showing the uneven state of an alignment film in an array substrate of an FFS-mode liquid crystal display panel.
Figure 6B:
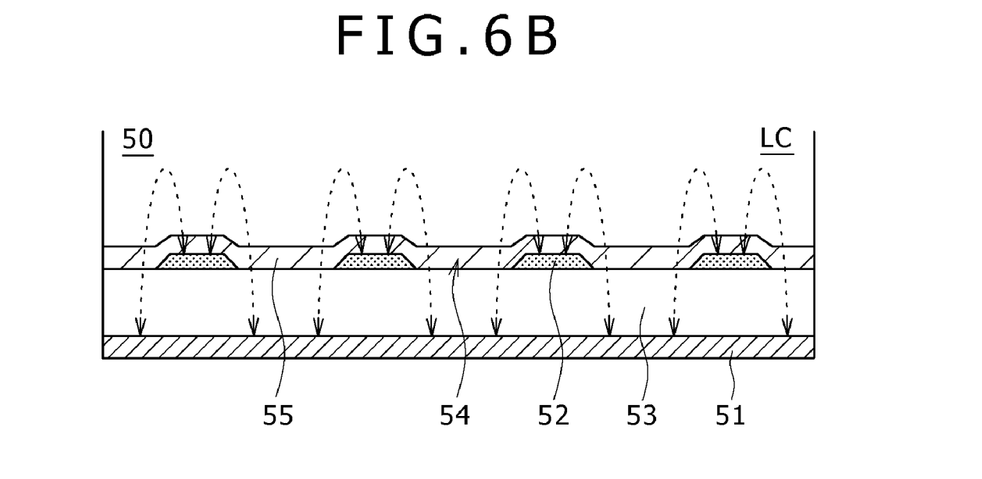
FIG. 6B is a diagram showing the formation state of the lines of electric force in the structure of FIG. 6A.
Figure 6C:
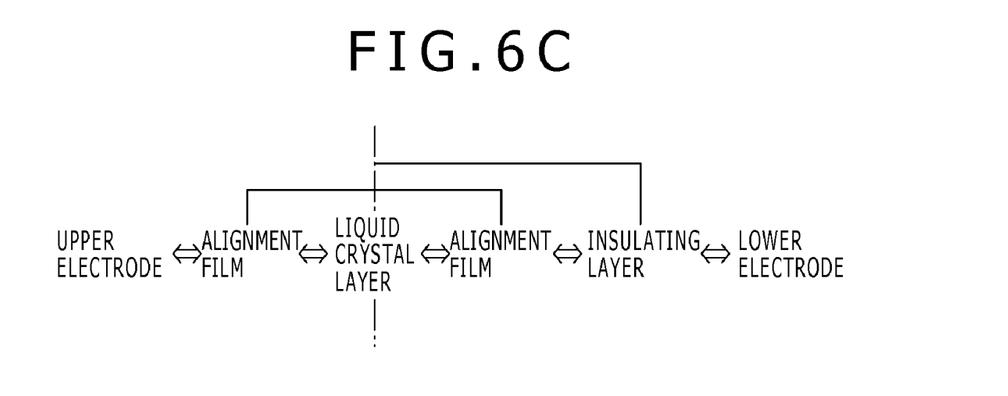
FIG. 6C is an explanatory diagram of the path of the lines of the electric force in FIG. 6B.

In both of the IPS-mode and FFS-mode liquid crystal display panels of the transverse electric field system, the surface on which an alignment film is formed is in an uneven state due to the electrode having a comb-teeth shape or the slit aperture of the upper electrode. The surface state of the array substrate of the FFS-mode liquid crystal display panels disclosed in Patent Documents 4 and 5 will be described below with use of FIGS. 6A to 6C. FIG. 6A is a schematic sectional view showing the uneven state of the alignment film in the array substrate of the FFS-mode liquid crystal display panel. FIG. 6B is a diagram showing the formation state of the lines of electric force in the structure of FIG. 6A. FIG. 6C is an explanatory diagram of the path of the lines of the electric force in FIG. 6B. In FIGS. 6A and 6B, only the structure of the lower electrode, the inter-electrode insulating film, the upper electrode, and the alignment film is shown.

In an array substrate 50 of this FFS-mode liquid crystal display panel, an inter-electrode insulating film 53 is formed between a lower electrode 51 and an upper electrode 52. In the upper electrode 52, plural slit apertures 54 are formed. When a voltage is applied between the lower electrode 51 and the upper electrode 52, an electric field is formed through the slit apertures 54 as shown in FIG. 6B. An alignment film 55 is so formed as to cover the upper electrode 52 and the inter-electrode insulating film 53 exposed at the bottoms of the slit apertures 54. The surface on which this alignment film 55 is formed is in an uneven state due to the existence of the slit apertures 54.

Because the alignment film 55 is formed by coating from the surface side of the upper electrode 52, such an uneven state causes a difference between the film thickness t1 of the recessed part due to the slit aperture 54 and the film thickness t2 of the projecting part due to the upper electrode 52. In the liquid crystal display panels disclosed in Patent Documents 4 and 5, the upper electrode 52 works as the common electrode and is formed across the pixels in the entire display area, and therefore a common line is not formed among the pixels. Therefore, it is desired to increase the film thickness of the upper electrode 52 working as the common electrode in order to prevent the upper electrode 52 from having high resistance.

However, when the film thickness of the upper electrode 52 is larger, the difference between the film thickness t1 of the recessed part of the alignment film 55 and the film thickness t2 of the projecting part thereof is larger. Furthermore, if the film thickness of the upper electrode 52 is increased, the thickness of the alignment film needs to be increased in order to cover the upper electrode 52. Thus, coating unevenness of the film thickness of the alignment film readily occurs, and as a result displaying unevenness readily occurs. In order to reduce nonuniformity of rubbing due to the step part of irregularity, provision of slope part B for the upper electrode 52 on the side of the slit aperture 54 is also attempted as shown in FIG. 6A. However, the nonuniformity of rubbing at part A of the alignment film 55 on slope part B of the upper electrode 52 is not completely eliminated although being reduced. Furthermore, part A of the alignment film 55 on slope part B of the upper electrode 52 involves also a problem that failure in the coverage of the alignment film 55 readily occurs. Such phenomena occur similarly also in the IPS-mode liquid crystal display panels.

Moreover, in the FFS-mode liquid crystal display panel, because the inter-electrode insulating film 53 is formed between the lower electrode 51 and the upper electrode 52, the path of the electric field formed between the lower electrode 51 and the upper electrode 52 is in the following order as shown in FIG. 6C: upper electrode 52←→alignment film 55←→liquid crystal layer LC←→alignment film 55←→insulating layer (inter-electrode insulating film 53)←→lower electrode 51. As just described, the path of the electric field from the viewpoint of the liquid crystal layer LC is asymmetric because an insulating layer (inter-electrode insulating film 53) exists between the liquid crystal layer LC and the lower electrode 51 but an insulating layer does not exist between the liquid crystal layer LC and the upper electrode 52. Thus, in the FFS-mode liquid crystal display panel of the related art, a bias of the accumulated charge in the alignment film occurs and burn-in in a short time and the drift of the optimum common electrode potential Vcom occur, so that flicker occurs in the energized state.

There is a need for the present application to provide a liquid crystal display panel of a transverse electric field system in which the surface on which an alignment film is formed is prevented from being in an uneven state due to an electrode having a comb-teeth shape or a slit aperture formed in an upper electrode and problems of displaying unevenness, flicker, and contrast lowering attributed to the irregularity are solved.

According to an embodiment, there is provided a liquid crystal display panel of a transverse electric field system. The liquid crystal display panel includes a liquid crystal layer and a pair of substrates configured to be so disposed as to be opposed to each other and sandwich the liquid crystal layer. A first electrode and a second electrode for applying an electric field to the liquid crystal layer and an alignment film are formed in a plurality of pixel areas that form a display area in one of the pair of substrates. A planarization insulating film is formed on the surface of at least one of the first electrode and the second electrode and across the entire surface of the pixel areas. The alignment film is formed on the surface of the planarization insulating film.

In the liquid crystal display panel according to the embodiment, the alignment film is formed on the planarization insulating film formed on the surface of at least one of the first electrode and the second electrode and across the entire surface of the display area, and therefore the surface of the alignment film is flat. Therefore, the liquid crystal display panel according to the embodiment allows elimination of the following problems arising in the array substrate of the related-art liquid crystal display panels of the transverse electric field system: difference in the film thickness of the alignment film attributed to irregularity due to the electrode closer to the liquid crystal layer; failure in formation of the alignment film at the slope part of the step of the electrode; coating unevenness of the alignment film attributed to the step of the electrode; nonuniformity of rubbing treatment due to irregularity of the alignment film; and so forth. Thus, a liquid crystal display panel having a favorable display quality is achieved.

In the liquid crystal display panel according to the embodiment, it is preferable that an inter-electrode insulating film be formed between the first electrode and the second electrode.

If the inter-electrode insulating film is formed between the first electrode and the second electrode like in part of the IPS-mode liquid crystal display panels and the FFS-mode liquid crystal display panels as the related-art liquid crystal display panels of the transverse electric field system, the path of the electric field between the first electrode and the second electrode (when the first electrode is defined as the electrode closer to the liquid crystal layer) is in the following order: first electrode←→alignment film←→liquid crystal layer←→alignment film←→insulating layer←→second electrode. Thus, the path of the electric field is asymmetric about the liquid crystal layer. Therefore, in the related-art liquid crystal display panels, a bias of the accumulated charge in the alignment film readily occurs and burn-in in a short time and the drift of the optimum common electrode potential Vcom readily occur, so that flicker readily occurs in the energized state.

However, in the liquid crystal display panel according to the embodiment, the planarization insulating film is disposed between the alignment film and the first electrode, and thus the path of the electric field between the first electrode and the second electrode is in the following order: first electrode←→insulating layer←→alignment film←→liquid crystal layer←→alignment film←→insulating layer←→second electrode. That is, the path of the electric field is symmetric about the liquid crystal layer. Therefore, in the liquid crystal display panel according to the embodiment, a bias of the accumulated charge in the alignment film occurs less readily and thus burn-in in a short time and the drift of the optimum common electrode potential Vcom occur less readily, so that a liquid crystal display panel having a more favorable display quality is achieved.

The liquid crystal display panel according to the embodiment may have the following configuration. Specifically, the first electrode and the second electrode overlap with each other in plan view. An aperture is formed in the electrode closer to the liquid crystal layer, of the first electrode and the second electrode, for each of the plurality of pixel areas. The planarization insulating film is formed on the electrode closer to the liquid crystal layer, of the first electrode and the second electrode, and on the aperture, and the surface of the alignment film is planarized.

In the liquid crystal display panel according to the embodiment, the electrode closer to the liquid crystal layer, of the first electrode and the second electrode, works as either the pixel electrode or the common electrode. Even when the thickness of the electrode closer to the liquid crystal layer is increased, the alignment film can be planarized because of the existence of the planarization insulating film. Therefore, the liquid crystal display panel according to the embodiment is free from the limit to the film thickness of the electrode closer to the liquid crystal layer, of the first electrode and the second electrode, arising in the related arts due to trade-off problems such as displaying unevenness attributed to increase in the thickness of the alignment film and the restriction that the film thickness step of the upper electrode must be covered by the alignment film. Thus, for example, if the electrode closer to the liquid crystal layer is made to work as the common electrode formed across the entire surface of the display area, the resistance of the electrode can be decreased by arbitrarily selecting the film thickness of the electrode. Furthermore, the drift of the optimum common electrode potential Vcom, which occurs due to difference in the film thickness of the alignment film attributed to irregularity of the electrode closer to the liquid crystal layer, also occurs less readily. Because of these synergy effects, an FFS-mode liquid crystal display panel having a favorable display quality is achieved.

The liquid crystal display panel according to the embodiment may have the following configuration. Specifically, the first electrode and the second electrode do not overlap with each other in plan view. The planarization insulating film is formed over the first electrode and the second electrode, and the surface of the alignment film is planarized.

The liquid crystal display panel according to the embodiment allows achievement of an IPS-mode liquid crystal display panel that can provide the above-described effects. Specifically, the problem of the drift of the optimum common electrode potential Vcom and coating unevenness of the alignment film attributed to irregularity of the electrode closer to the liquid crystal layer are solved.

In the liquid crystal display panel according to the embodiment, it is preferable that the planarization insulating film be composed of an acrylic-based or polysiloxane-based resin material.

If a film composed of an acrylic-based or polysiloxane-based resin material is employed as the planarization insulating film, the planarization insulating film can be formed by using the same material as that of other films in the liquid crystal display panel, such as the interlayer insulating film in the array substrate and the overcoat layer formed in the color filter substrate. Therefore, the liquid crystal display panel according to the embodiment is free from the need to separately prepare the material for forming the planarization insulating film.

In the liquid crystal display panel according to the embodiment, it is preferable that the film thickness of the planarization insulating film be at least 0.05 μm and at most 0.5 μm on the surface of at least one of the first electrode and the second electrode.

It is not preferable that the film thickness of the planarization insulating film be smaller than 0.05 μm because the planarization of the alignment film is difficult. Furthermore, it is not preferable that the film thickness of the planarization insulating film be larger than 0.5 μm because the distance between the first and second electrodes for driving the liquid crystal is too long and thus the desired electric field strength can not be obtained, and the application voltage needs to be increased and thus the power consumption is increased.

In the liquid crystal display panel according to the embodiment, it is preferable that a terminal, a routing interconnect electrically connected to the terminal, and an interconnect insulating film covering the routing interconnect be formed in a peripheral part of the display area, and the interconnect insulating film be composed of the same material as the material of the planarization insulating film.

In the liquid crystal display panel according to the embodiment, the interconnect insulating film for protecting the surface of the routing interconnect and the planarization insulating film can be formed in the same step. This eliminates the need to particularly set a step for manufacturing the interconnect insulating film for protecting the surface of the routing interconnect.

Additional features and advantages are described herein, and will be apparent from the following Detailed Description and the figures.

DETAILED DESCRIPTION

Modes for carrying out the present application will be described below with reference to embodiments of the present application and the drawings. The embodiments shown below do not intend to limit the present application to the description of the embodiments, but the present application can be evenly applied to techniques obtained by making various changes without departing from the technical idea shown in the scope of claims.

The "surface" of the array substrate and the color filter substrate in the present specification refers to the surface over which various kinds of interconnects are formed or the surface opposed to the liquid crystal. Furthermore, in the respective drawings used for the description in the present specification, the respective layers and the respective members are so represented that the scale is changed for each layer and each member so that the respective layers and the respective members may have such sizes as to be recognizable in the drawings, and they are not necessarily represented in proportion to the actual dimensions.

First Embodiment

Figure 3:
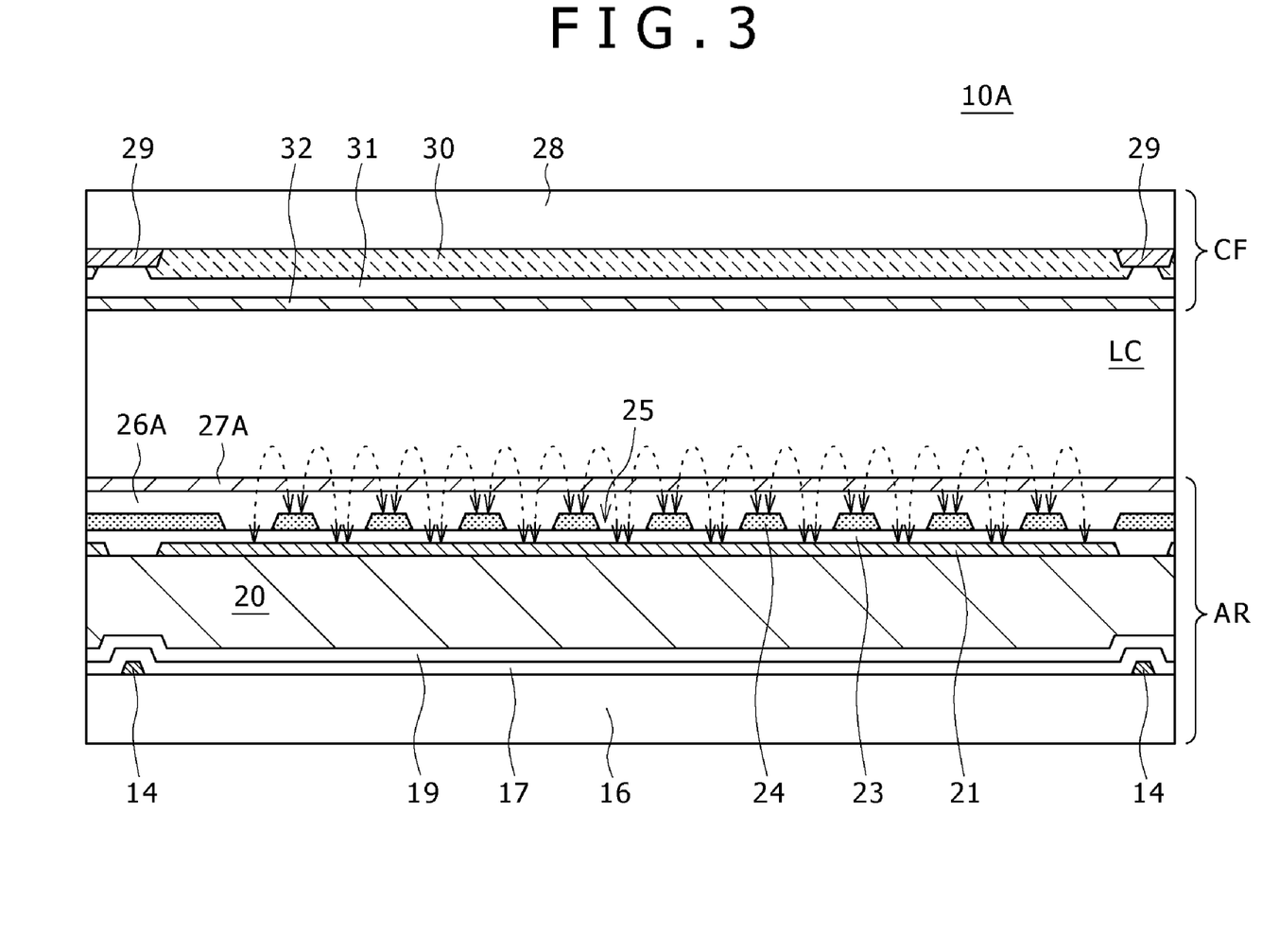
FIG. 3 is a sectional view along line in FIG. 2.
Figure 4A:
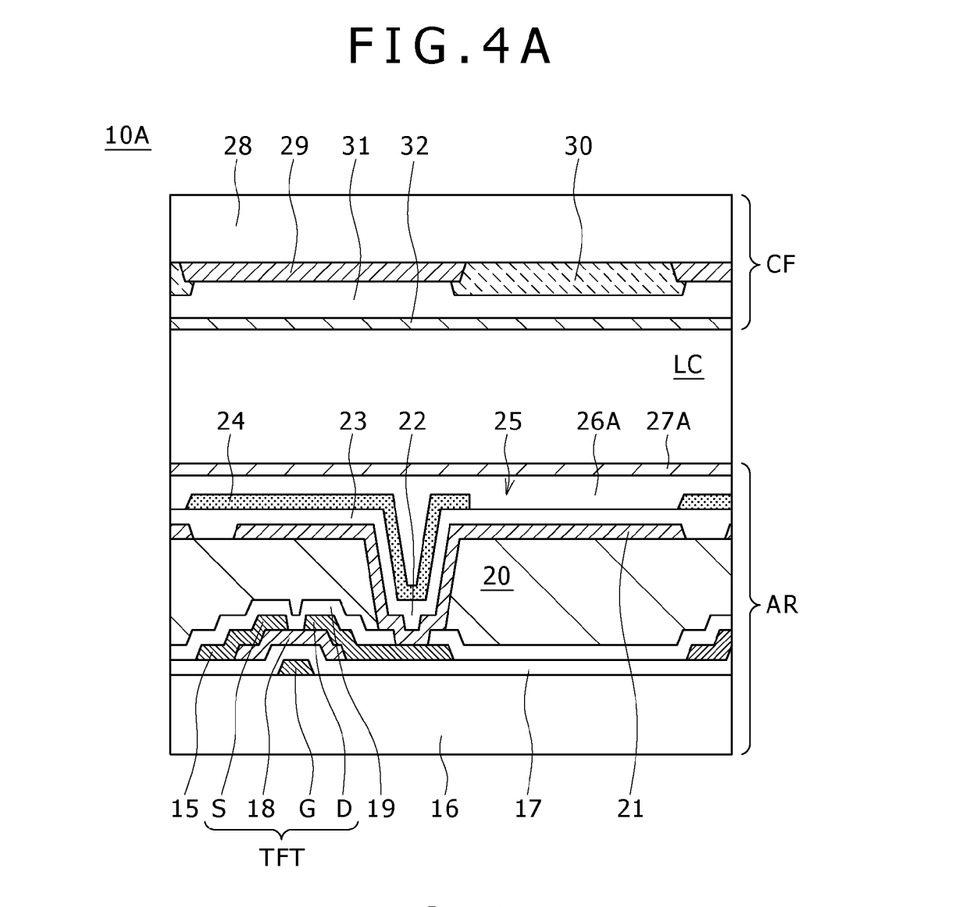
FIG. 4A is a sectional view along line IV-IV in FIG. 2.

An FFS-mode liquid crystal display panel 10A in which an array substrate according to a first embodiment is used will be described below with use of FIGS. 1 to 4. As shown in FIGS. 1B, 3, and 4A, in the liquid crystal display panel 10A, a liquid crystal layer LC is sandwiched between an array substrate AR and a color filter substrate CF. The liquid crystal layer LC is sealed by a seal material 11 so that the liquid crystal layer LC may be prevented from leaking out from between the array substrate AR and the color filter substrate CF, and the thickness of the liquid crystal layer LC is evenly maintained by a column spacer (not shown). A polarizer (not shown) is formed on each of the back surface of the array substrate AR and the front surface of the color filter substrate CF. Light is emitted to the liquid crystal display panel 10A by a backlight (not shown) from the back surface side of the array substrate AR. The liquid crystal display panel 10A has plural pixels aligned along the row direction and the column direction although diagrammatic representation thereof is omitted. One pixel is configured by sub-pixels of three colors of red (R), green (G), and blue (B) for example, and the color of each pixel is determined depending on mixing of light beams of these colors.

Figure 2:
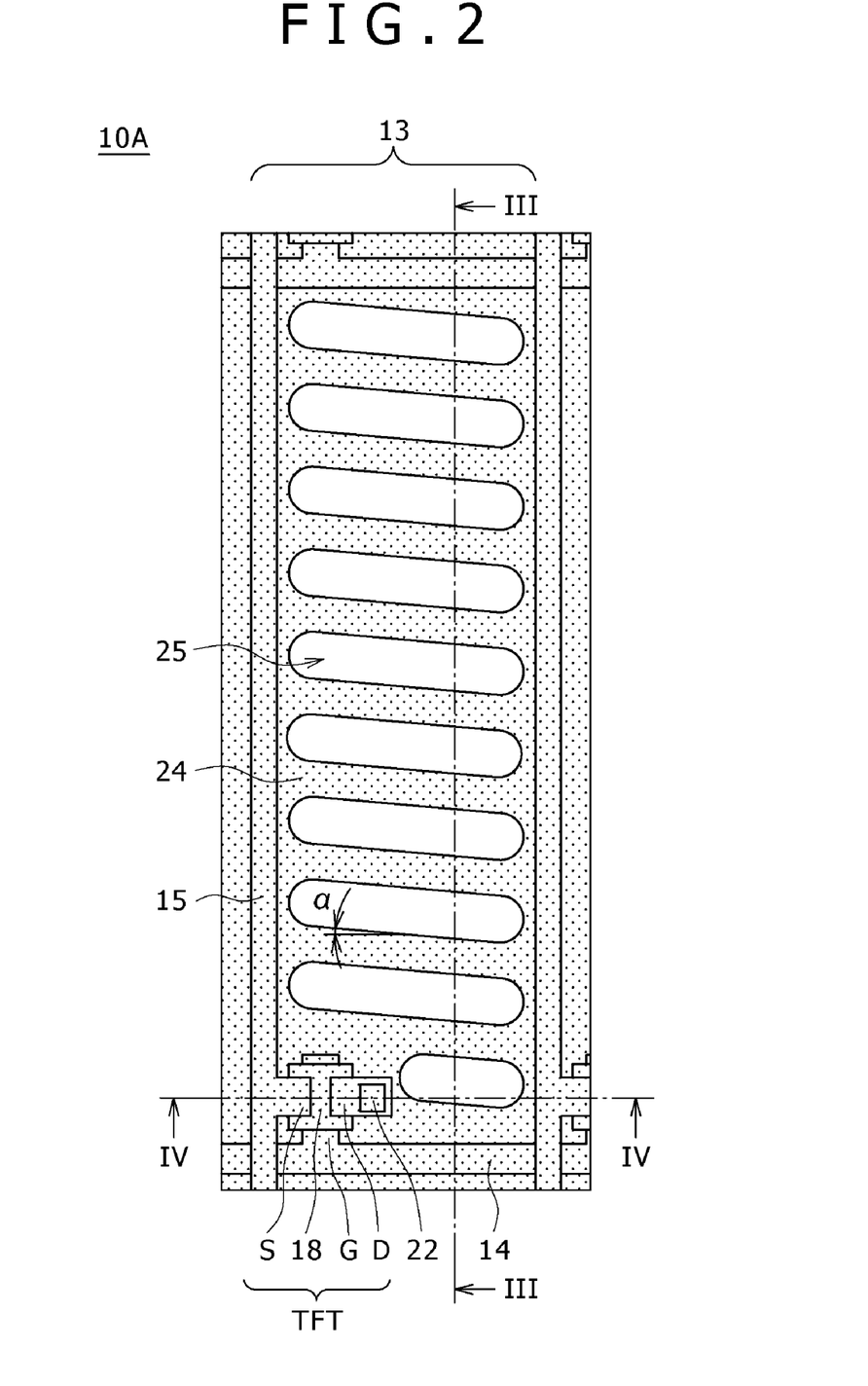
FIG. 2 is a plan view showing the outline of one pixel on an array substrate in an FFS-mode liquid crystal display panel of a first embodiment.

As shown in FIG. 2, each pixel 13 on the array substrate AR is provided with a scan line 14 that is extended along the row direction and composed of an opaque metal such as aluminum or molybdenum, a signal line 15 that is extended along the column direction and composed of an opaque metal such as aluminum or molybdenum, and a TFT provided near the intersection of the scan line 14 and the signal line 15.

As shown in FIGS. 3 and 4A, the base of the array substrate AR is a first transparent substrate 16 composed of glass, quartz, plastic, or the like that is transparent and has the insulating characteristic. On the first transparent substrate 16, the scan line 14 is formed on the side opposed to the liquid crystal layer LC. As shown in FIG. 2, a gate electrode G is extended from the scan line 14. A transparent gate insulating film 17 composed of silicon nitride, silicon oxide, or the like is so stacked as to cover the scan line 14 and the gate electrode G. A semiconductor layer 18 composed of amorphous silicon or the like is formed on the gate insulating film 17 overlapping with the gate electrode G in plan view. The plural signal lines 15 composed of a metal such as aluminum or molybdenum are formed on the gate insulating film 17 along the column direction in FIG. 2. Each of the areas defined by these scan lines 14 and signal lines 15 serves as the area of the pixel 13. A source electrode S is extended from this signal line 15, and this source electrode S is partially in contact with the surface of the semiconductor layer 18.

A drain electrode D that is formed by using the same material as that of the signal line 15 and the source electrode S simultaneously with the signal line 15 and the source electrode S is provided on the gate insulating film 17. This drain electrode D is disposed near the source electrode S and partially in contact with the surface of the semiconductor layer 18. Because one pixel having a substantially square shape is configured by three pixels 13 of red (R), green (G), and blue (B), the pixel 13 trisecting this one pixel is a rectangle that has the shorter side along the scan line 14 and has the longer side along the signal line 15. The TFT serving as a switching element is configured by the gate electrode G, the gate insulating film 17, the semiconductor layer 18, the source electrode S, and the drain electrode D, and this TFT is formed in each pixel 13.

A transparent passivation film 19 composed of e.g. silicon nitride or silicon oxide is so stacked as to cover the signal lines 15, the TFTs, and the exposed part of the gate insulating film 17. Furthermore, an interlayer insulating film 20 composed of a transparent resin material such as an acrylic is so stacked as to cover the passivation film 19. The interlayer insulating film 20 is provided in order to planarize the concave-convex surface of the passivation film 19 due to the scan line 14, the signal line 15, the TFT, and the gate insulating film 17. A lower electrode 21 (equivalent to the first electrode or the second electrode of the present application) composed of a transparent electrically-conductive material such as indium tin oxide (ITO) or indium zinc oxide (IZO) is so formed as to cover the interlayer insulating film 20. Furthermore, a contact hole 22 that penetrates the interlayer insulating film 20 and the passivation film 19 to reach the drain electrode D is formed, and the lower electrode 21 and the drain electrode D are electrically connected to each other via this contact hole 22. Thus, the lower electrode 21 works as the pixel electrode.

A transparent inter-electrode insulating film 23 composed of e.g. silicon nitride or silicon oxide is so stacked as to cover the lower electrode 21. Furthermore, an upper electrode 24 (equivalent to the second electrode or the first electrode of the present application) that is composed of a transparent electrically-conductive material such as ITO or IZO and has a thickness t0 is so formed as to cover the inter-electrode insulating film 23. The upper electrode 24 is formed across all the pixels 13 in the display area and electrically connected to a common interconnect (not shown) in the non-display area. This upper electrode 24 works as the common electrode. In the upper electrode 24, plural slit apertures 25 are formed for each pixel 13 as shown in FIG. 2. The slit apertures 25 are formed by performing exposure and development of a photoresist material applied on the surface of the upper electrode 24 by a photolithography method and then performing etching.

A planarization insulating film 26A composed of e.g. a photosensitive polysiloxane-based material is so formed as to cover the upper electrode 24 and the inter-electrode insulating film 23 exposed through the slit aperture 25. The polysiloxane-based material to become the planarization insulating film 26A is applied to a thickness of e.g. 0.1 to 0.8 µm in consideration of the thickness t0 of the upper electrode 24 (t0=0.05 µm, in the present embodiment) and film loss by the development and shrink by baking (about 0.1 to 0.3 µm). Thereafter, decolorization and heat curing are performed by bleaching exposure and baking, and thereby the planarization insulating film 26A is completed. It is preferable that the thickness of the completed planarization insulating film 26A be in the range of 0.05 to 0.5 µm on the upper electrode 24. If the film thickness of the planarization insulating film 26A is smaller than 0.05 µm, the surface planarization is difficult. If the film thickness of the planarization insulating film 26A is larger than 0.5 µm, the distance between the first and second electrodes for driving the liquid crystal is too long and thus the desired electric field strength can not be obtained. In addition, a high application voltage is necessary and thus the power consumption is increased.

Although the example is shown above in which a photosensitive polysiloxane-based material is used as the material of the planarization insulating film 26A in order to make an aperture in the insulating film for a driver terminal part 33 and a flexible printed board terminal part 34, which will be described later, by less processes, the planarization insulating film 26A may be formed by using a non-photosensitive, heat-curable, SiO2-based spin-on-glass (SOG) material, and thereafter the terminal part aperture may be formed by a normal photolithography method later. The material of the planarization insulating film 26A is not limited to the above-described materials but a material can be appropriately selected and employed from resin materials such as an acrylic-based material, a polysiloxane-based material, a polyimide-based material, and an epoxy acrylate-based material and inorganic materials such as a silicon nitride-based material and a silicon oxide-based material. Because polysiloxane-based and acrylic-based materials are frequently used for the liquid crystal display panel, it is preferable to use a polysiloxane-based or acrylic-based resin material as the material of the planarization insulating film 26A for material sharing.

By this planarization insulating film 26A, irregularity due to the slit apertures 25 are planarized. That is, the surface of the formed planarization insulating film 26A is a flat surface free from irregularity. A first alignment film 27A composed of e.g. polyimide is so stacked as to cover the planarization insulating film 26A. For the first alignment film 27A, rubbing treatment is performed along the direction parallel to the extension direction of the scan line 14 toward the right side of FIG. 2. The rubbing treatment is to form a large number of fine grooves along one direction in the first alignment film 27A by rubbing the alignment film with a rubbing cloth having tiny hairs. The direction of the rubbing treatment is inclined to the extension direction of the slit apertures 25 by a predetermined angle α. This allows the liquid crystal molecules to rotate in one direction. It is preferable that a be 3° to 15° although differing depending on various conditions. In the present embodiment, 5° is employed as the optimum value of α.

As described above, in the liquid crystal display panel 10A of the first embodiment, the first alignment film 27A is formed on the planarized surface of the planarization insulating film 26A. Therefore, the first alignment film 27A can be formed on the surface of the planarization insulating film 26A with a uniform thickness. This makes it possible to eliminate the following problems existing in the related-art examples: difference in the thickness of the alignment film attributed to the slit aperture and the upper electrode; coating unevenness of the alignment film at the slope part of the step of the upper electrode; and nonuniformity of rubbing treatment due to irregularity of the alignment film surface.

Figure 4B:
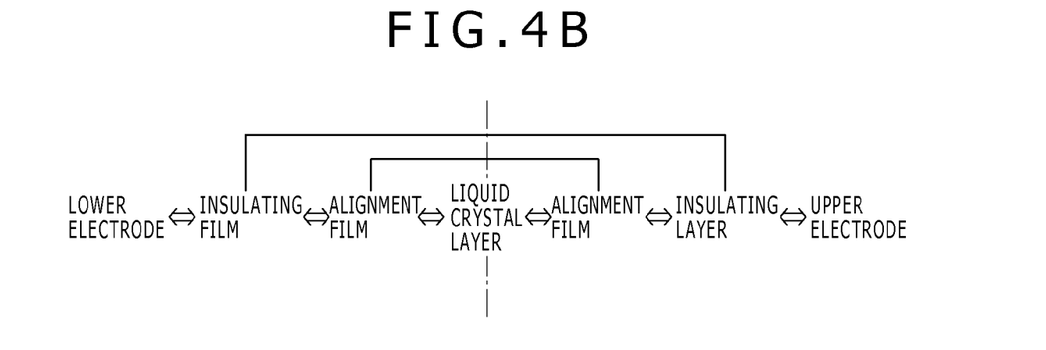
FIG. 4B is an explanatory diagram of the path of the lines of electric force in FIG. 3.

The array substrate AR of the liquid crystal display panel 10A of the first embodiment is an example for the FFS mode, and the inter-electrode insulating film 23 is formed between the lower electrode 21 and the upper electrode 24. However, because the planarization insulating film 26A is formed between the upper electrode 24 and the first alignment film 27A, the path of the electric field between the lower electrode 21 and the upper electrode 24 is in the following order as shown in FIG. 4B: lower electrode 21←→insulating layer (inter-electrode insulating film 23+planarization insulating film 26A)←→first alignment film 27A←→liquid crystal layer LC←→first alignment film 27A ←→insulating layer (planarization insulating film 26A)←→upper electrode 24.

That is, the path of the electric field is symmetric with respect to the liquid crystal layer. Therefore, the liquid crystal display panel 10A of the first embodiment allows elimination of burn-in in a short time and flicker due to a bias of the accumulated charge in the first alignment film 27A.

The base of the color filter substrate CF is a second transparent substrate 28 composed of glass, quartz, plastic, or the like that is transparent and has the insulating characteristic. On the lowermost layer of the second transparent substrate 28, a light-blocking layer 29 composed of e.g. a resin or a metal, such as chromium, having the light-blocking characteristic is formed at the position opposed to the scan line 14, the signal line 15, and the TFT. In addition, on the same layer, a color filter layer 30 through which light of a color different for each of the pixels 13 (e.g. R, G, B, or colorless light) can pass is formed.

An overcoat layer 31 composed of a transparent resin material such as a photoresist is so stacked as to cover the light-blocking layer 29 and the color filter layer 30. The overcoat layer 31 is formed in order to planarize steps among the pixels due to the color filter layers 30 of the different colors and block impurities leaked out from the light-blocking layer 29 and the color filter layer 30 so that the impurities may be prevented from entering the liquid crystal layer LC. A second alignment film 32 composed of e.g. polyimide is so formed as to cover the overcoat layer 31. For the second alignment film 32, rubbing treatment in the direction opposite to the rubbing direction for the first alignment film 27A is performed. The array substrate AR and the color filter substrate CF formed in the above-described manner are made to be opposed to each other, and the seal material 11 is provided around both substrates to thereby bond both substrates to each other. Subsequently, a liquid crystal in homogeneous alignment is packed between both substrates, and thus the liquid crystal display panel 10A is achieved.

Based on the above-described configuration, in the pixel 13, when the TFT enters the ON-state, an electric field is generated between the lower electrode 21 and the upper electrode 24, and the alignment direction of the liquid crystal molecules in the liquid crystal layer LC changes. This changes the optical transmittance of the liquid crystal layer LC and allows image displaying in the FFS mode. The area across which the lower electrode 21 and the upper electrode 24 are opposed to each other with the intermediary of the inter-electrode insulating film 23 forms auxiliary capacitance and holds the electric field between the lower electrode 21 and the upper electrode 24 for a predetermined time when the TFT is turned to the OFF-state.

Next, wiring for the upper electrode 24 in the non-display area in FIG. 1A (area other than the display area DA) will be described below. Around one side of the non-display area, the driver terminal part 33 and the flexible printed board terminal part 34 are formed. In the driver terminal part 33, plural terminals 33a to which a driver IC (not shown) is connected are formed. In the flexible printed board terminal part 34, plural terminals to which a flexible printed board (not shown) connected to an external controller is connected are formed. Furthermore, a first interconnect part 35 and a second interconnect part 36 are formed in the non-display area. In the first interconnect part 35, the respective routing interconnects that lead the scan line 14 and the signal line 15 to the driver terminal part 33 and the flexible printed board terminal part 34 are formed. In the second interconnect part 36, a common routing interconnect that leads the upper electrode 24 to the driver terminal part 33 and the flexible printed board terminal part 34 is formed.

The upper electrode 24 is formed across all the pixels 13 in the display area, and is connected to the common interconnect in the second interconnect part 36 by a contact hole (not shown) formed in the non-display area so that the upper electrode 24 can work as the common electrode. If the resistance of this upper electrode 24 becomes high, the potential of the upper electrode 24 working as the common electrode becomes unstable, which causes characteristic failures such as flicker and crosstalk. This causes the need to increase the thickness t0 of the upper electrode 24 in order to set the resistance of the upper electrode 24 equal to or lower than the predetermined value. However, in the liquid crystal display panel 10A of the first embodiment, the existence of the planarization insulating film 26A prevents the generation of steps in the first alignment film 27A even when the film thickness of the upper electrode 24 is increased.

Figure 1A:
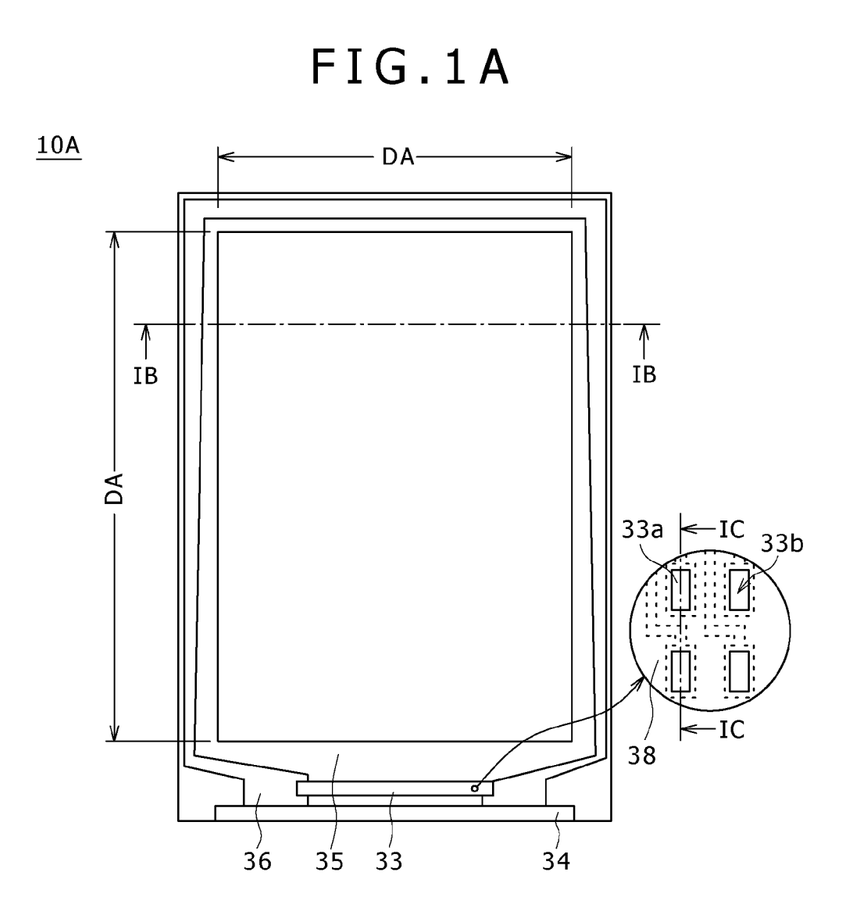
FIG. 1A is a plan view showing the outline of a liquid crystal display panel common to the respective embodiments of the present application.
Figure 1B:
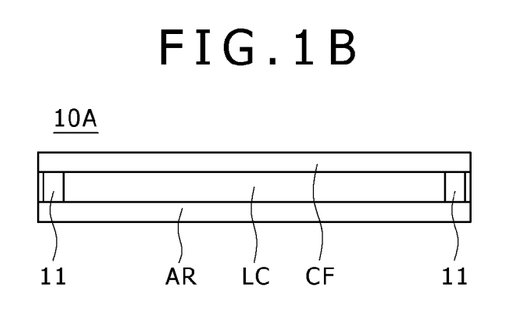
FIG. 1B is a sectional view along line IB-IB in FIG. 1A.
Figure 1C:
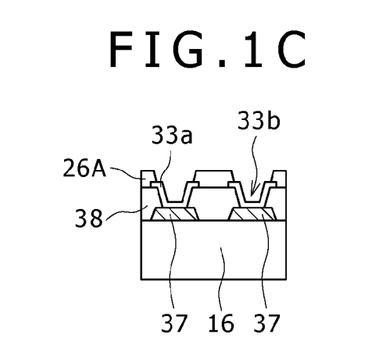
FIG. 1C is a sectional view along line IC-IC in FIG. 1A.

As shown in FIGS. 1A and 1C, apertures are formed in an interconnect insulating film 38 covering routing interconnects 37, and the surfaces of the terminals 33a in the driver terminal part 33 are exposed. Terminal surface parts 33b are so formed as to cover the interconnect insulating film 38 and the exposed parts of the terminals 33a in the same step as that for the lower electrode 21 or the upper electrode 24. The planarization insulating film 26A is so formed as to cover the interconnect insulating film 38 and the terminal surface parts 33b, and apertures that each expose part of the terminal surface part 33b are formed. The interconnect insulating film 38 may be formed by using the same material as that of the planarization insulating film 26A.

Second Embodiment

Figure 5A:
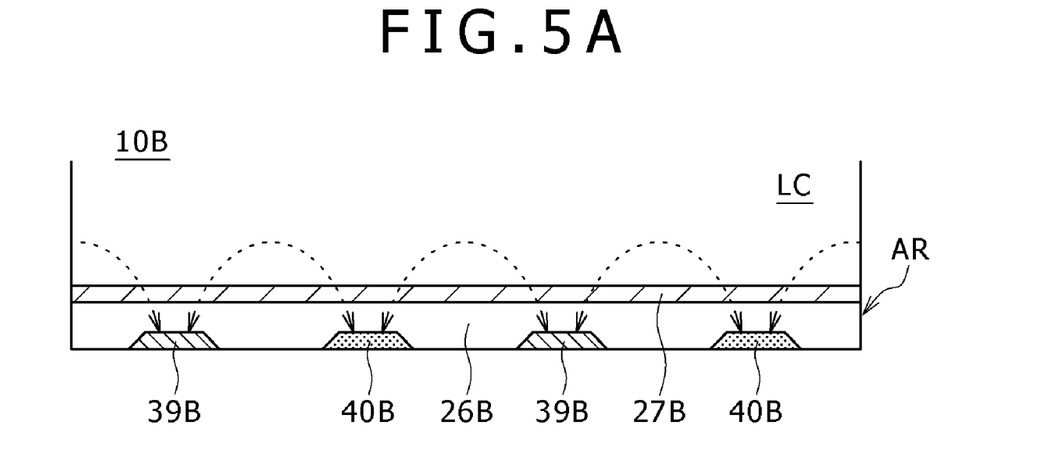
FIG. 5A is a diagram showing the path of an electric field between a common electrode and a pixel electrode in an IPS-mode liquid crystal display panel of a second embodiment.

An example of the FFS-mode liquid crystal display panel is shown above as the liquid crystal display panel 10A of the first embodiment. Next, as an array substrate AR of a liquid crystal display panel 10B of a second embodiment, an example of the IPS-mode liquid crystal display panel will be described below with use of FIG. 5A. In FIG. 5A, diagrammatic representation is omitted regarding the configuration other than a common electrode 39B (equivalent to the first electrode or the second electrode of the present application), a pixel electrode 40B (equivalent to the second electrode or the first electrode of the present application), a planarization insulating film 26B, and a first alignment film 27B.

In the array substrate AR of the liquid crystal display panel 10B of the second embodiment, the common electrode 39B and the pixel electrode 40B for applying an electric field to the liquid crystal layer LC are formed on the same surface. The planarization insulating film 26B is so formed as to cover the common electrode 39B and the pixel electrode 40B. The planarization insulating film 26B planarizes irregularity arising due to the common electrode 39B and the pixel electrode 40B, and thus the surface of the planarization insulating film 26B is a flat surface free from irregularity. In the array substrate AR of the liquid crystal display panel 10B of the second embodiment, the first alignment film 27B is formed on the surface of the planarization insulating film 26B having this planarized surface.

Therefore, also in the array substrate AR of the liquid crystal display panel 10B of the second embodiment, because the surface of the first alignment film 27B is planarized, the following problems existing in the related-art examples are eliminated: difference in the thickness of the alignment film attributed to irregularity formed due to the common electrode and the pixel electrode; coating unevenness of the alignment film at the slope part of the step of the common electrode and the pixel electrode; and nonuniformity of rubbing treatment due to irregularity of the alignment film surface.

Third Embodiment

Figure 5B:
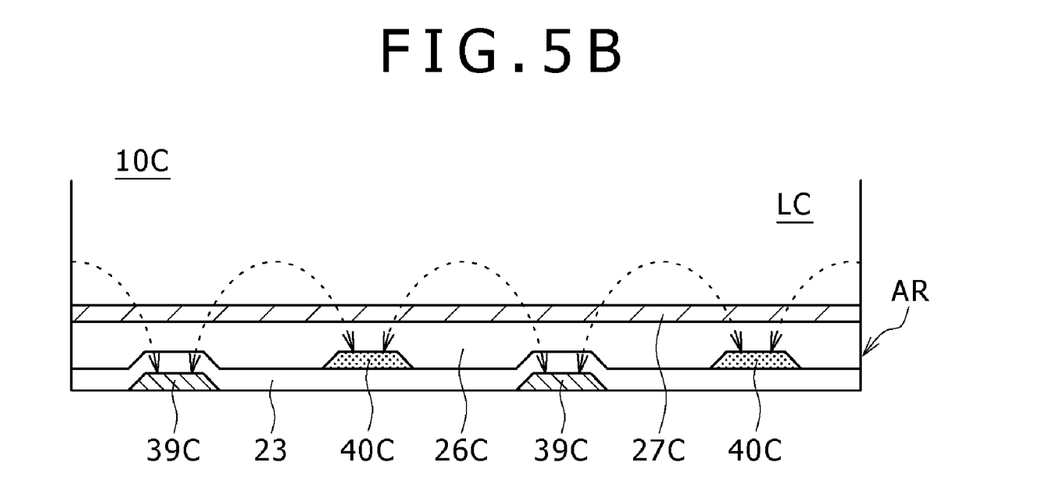
FIG. 5B is a diagram showing the path of an electric field between a common electrode and a pixel electrode in an IPS-mode liquid crystal display panel of a third embodiment.

As the array substrate AR of the liquid crystal display panel 10B of the second embodiment, an example of the IPS-mode liquid crystal display panel in which the common electrode 39B and the pixel electrode 40B for applying an electric field to the liquid crystal layer LC are formed on the same surface is shown above. As an array substrate AR of a liquid crystal display panel 10C of a third embodiment, an example of the IPS-mode liquid crystal display panel in which a common electrode 39C and a pixel electrode 40C are formed on surfaces different from each other will be described below with use of FIG. 5B. In FIG. 5B, diagrammatic representation is omitted regarding the configuration other than an inter-electrode insulating film 23, a common electrode 39C (equivalent to the first electrode or the second electrode of the present application), a pixel electrode 40C (equivalent to the second electrode or the first electrode of the present application), a planarization insulating film 26C, and a first alignment film 27C.

In the array substrate AR of the liquid crystal display panel 10C of the third embodiment, the inter-electrode insulating film 23 is so formed as to cover the common electrode 39C, and the pixel electrode 40C is formed on the inter-electrode insulating film 23. The common electrode 39C and the pixel electrode 40C are so provided as not to overlap with each other in plan view. The planarization insulating film 26C is so formed as to cover the inter-electrode insulating film 23 and the pixel electrode 40C. The planarization insulating film 26C planarizes irregularity arising due to the common electrode 39C and the pixel electrode 40C. Specifically, also in the array substrate AR of the IPS-mode liquid crystal display panel 10C of the third embodiment, the surface of the planarization insulating film 26C is a flat surface free from irregularity similarly to the case of the IPS-mode liquid crystal display panel 10B of the second embodiment. In the array substrate AR of the liquid crystal display panel 10C of the third embodiment, the first alignment film 27C is so formed as to cover this planarization insulating film 26C.

Therefore, also in the array substrate AR of the liquid crystal display panel 10C of the third embodiment, because the surface of the first alignment film 27C is planarized, the following problems existing in the related-art examples are eliminated: difference in the thickness of the alignment film attributed to irregularity formed due to the common electrode and the pixel electrode; coating unevenness of the alignment film at the slope part of the step of the common electrode and the pixel electrode; and nonuniformity of rubbing treatment due to irregularity of the alignment film surface.

Furthermore, although the inter-electrode insulating film 23 is formed between the common electrode 39C and the pixel electrode 40C, the planarization insulating film 26C exists between the pixel electrode 40C and the first alignment film 27C and therefore the path of the electric field between the common electrode 39C and the pixel electrode 40C is in the following order: common electrode 39C←→insulating layer (inter-electrode insulating film 23+planarization insulating film 26C)←→first alignment film 27C←→liquid crystal layer LC←→first alignment film 27C←→insulating layer (planarization insulating film 26C)←→pixel electrode 40C. That is, the path of the electric field is symmetric with respect to the liquid crystal layer LC. Therefore, the array substrate AR of the liquid crystal display panel 10C of the third embodiment also allows elimination of burn-in in a short time and flicker due to a bias of the accumulated charge in the first alignment film 27C.

In the above-described embodiments, an example of the TFT having a bottom-gate structure in which amorphous silicon is used as the semiconductor layer 18 is shown. However, the present application is not limited thereto but can be applied also to the case of a TFT in which polycrystalline silicon, particularly low-temperature polycrystalline silicon (LTPS), is used. Furthermore, the present application can be applied also to the case of a TFT having a top-gate structure.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid crystal display panel of a transverse electric field system, comprising:
    a liquid crystal layer; and
    a pair of substrates configured to be so disposed as to be opposed to each other and sandwich the liquid crystal layer, wherein
    a first electrode and a second electrode for applying an electric field to the liquid crystal layer and an alignment film are formed in a plurality of pixel areas that form a display area in one of the pair of substrates,
    a planarization insulating film is formed on a surface of at least one of the first electrode and the second electrode and across an entire surface of the pixel areas, and
    the alignment film is formed on a surface of the planarization insulating film, and
    wherein a terminal, a routing interconnect electrically connected to the terminal, and an interconnect insulating film covering the routing interconnect are formed in a peripheral part of the display area, and the interconnect insulating film is composed of the same material as a material of the planarization insulating film.

2. The liquid crystal display panel according to claim 1, wherein
    an inter-electrode insulating film is formed between the first electrode and the second electrode.

3. The liquid crystal display panel according to claim 2, wherein
    the first electrode and the second electrode overlap with each other in plan view,
    an aperture is formed in an electrode closer to the liquid crystal layer, of the first electrode and the second electrode, for each of the plurality of pixel areas, and
    the planarization insulating film is formed on the electrode closer to the liquid crystal layer, of the first electrode and the second electrode, and on the aperture, and a surface of the alignment film is planarized.

4. The liquid crystal display panel according to claim 1, wherein
    the planarization insulating film is composed of an acrylic-based or polysiloxane-based resin material.

5. The liquid crystal display panel according to claim 1, wherein
    film thickness of the planarization insulating film is at least 0.05 μm and at most 0.5 μm on the surface of at least one of the first electrode and the second electrode.

* * * * *